Dec. 15, 1936.    B. COLMAN    2,064,415
CAR LOADING DEVICE
Filed March 8, 1934
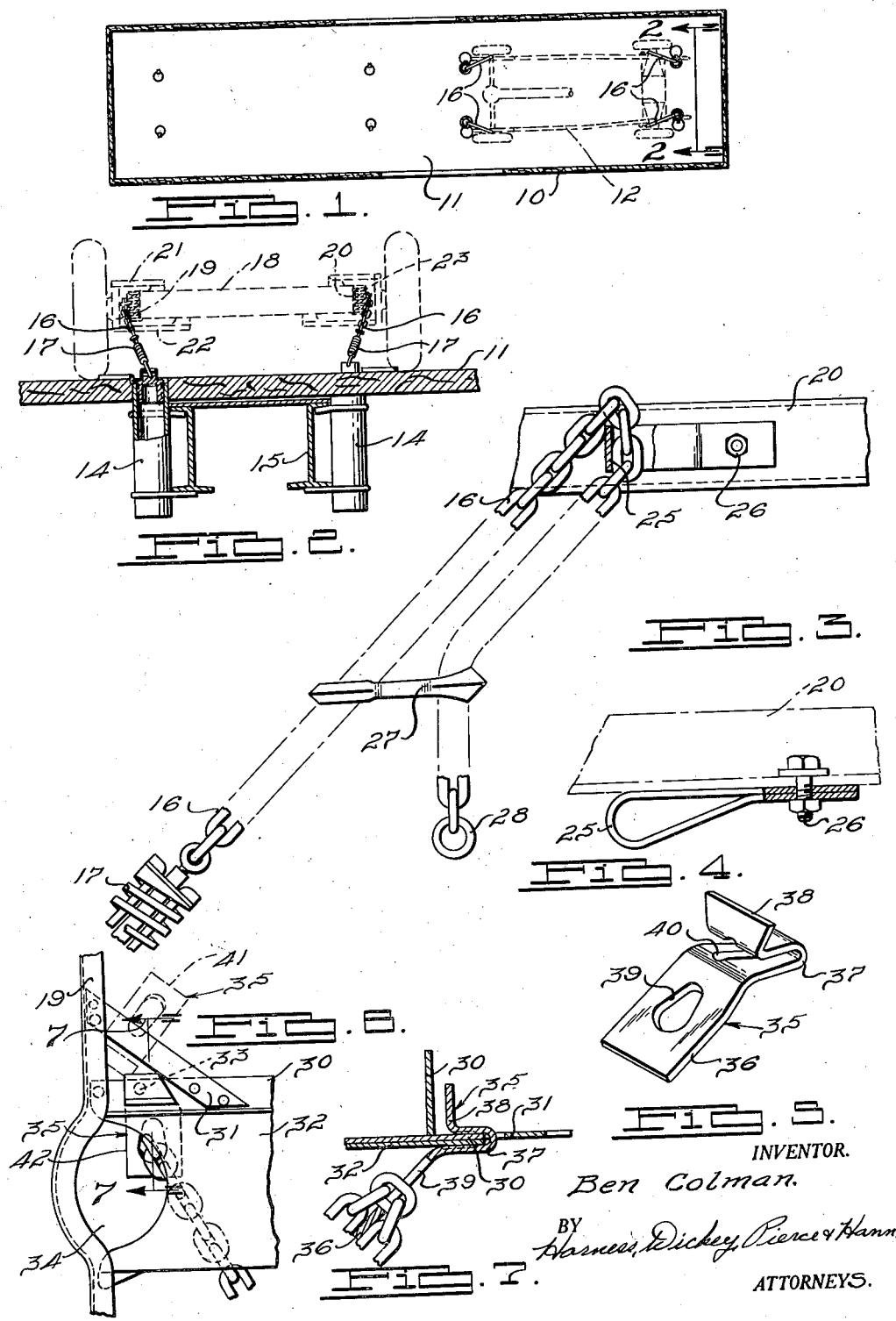
INVENTOR.
Ben Colman.
BY
Harness, Dickey, Pierce & Hann.
ATTORNEYS.

Patented Dec. 15, 1936

2,064,415

UNITED STATES PATENT OFFICE 2,064,415

CAR LOADING DEVICE

Ben Colman, Detroit, Mich., assignor to The Worth Company, a corporation of Michigan Application March 8, 1934, Serial No. 714,599

6 Claims. (Cl. 248—119)

The invention relates to loading devices and it has particular relation to devices for anchoring automobiles in freight cars for transportation purposes.

One object of the invention is to provide an improvement in loading devices which enables connection of the chassis frame of the automobile to a part of the freight car so that the automobile is anchored in position through the instrumentality of its frame.

Other objects of the invention will become apparent from the following description, the drawing relating thereto and from the claims hereinafter set forth.

For a better understanding of the invention, reference may be had to the drawing forming a part of the specification, wherein:

Figure 1 is a longitudinal cross-sectional view illustrating a freight car having an automobile therein anchored by devices constructed according to one form of the invention.

Fig. 2 is a cross-sectional view on a larger scale taken substantially along the line 2—2 of Fig. 1.

Fig. 3 is a fragmentary view on a larger scale illustrating the manner in which the loading devices are connected to the chassis frame of the automobile.

Fig. 4 is a plan view of the anchoring strap with parts shown in cross section.

Fig. 5 illustrates another form of anchoring element.

Fig. 6 illustrates application and use of the anchoring element shown by Fig. 5.

Fig. 7 is a cross-sectional view taken along the line 7—7 of Fig. 6.

Referring to Figs. 1 and 2, the side walls of the freight car are indicated at 10, the floor at 11 and an automobile within the car is indicated in broken lines at 12. Normally in loading automobiles in freight cars two automobiles will be anchored on the floor and at each end of the car an automobile will be anchored in an inclined position at least partially disposed over the adjacent automobile on the floor. For holding the end automobiles in inclined position, it is the practice to use a frame having channelways for receiving the wheels. The devices for anchoring the automobiles on the floor include a housing well 14 connected to a structural beam 15 under the floor and this housing well opens to the upper side of the floor. Chain anchoring devices 16 including resilient connections 17 are adapted to be housed by the wells 14 when the device is not in use, and when in use these chains project above the floor for connection with the automobile. The housing well and chain construction are more particularly disclosed and claimed in the co-pending application of Samuel D. Butterworth, Serial No. 606,602, filed April 21, 1932.

The invention is especially designed to cooperate with automobiles having individually sprung wheels and it will be appreciated that in this type of wheel mounting, ordinarily the axle connecting the wheels is eliminated. In the particular construction of automobile illustrated, the chassis frame is indicated at 18 and includes opposed channels 19 and 20 having their open portions innermost and each of the wheels is pivotally connected to the frame by means of upper and lower links 21 and 22 which permit the wheel to move in a vertical plane relative to the frame. A spring 23 may be disposed between a portion of the chassis frame and the lower link 22 so as to provide a resilient mounting between the wheels and chassis frame construction.

For connecting the chains to the frame, each of the channel members 19 and 20 at its outer side has a strap 25 which is folded intermediate its ends to provide a loop and the end portions of the strap are brought together and secured to the channel frame member by a bolt passing through openings in the end portions of the strap and an opening in the base portion of the channel. Ordinarily such an opening is provided in the channel by the automobile manufacturer, but if not provided, it may be formed very readily for the purpose of loading the automobile in the car. The chain anchoring device includes a grab hook 27 and the particular construction of this hook does not form a part of this invention as it is disclosed and claimed in Patent 1,889,633, issued to Samuel D. Butterworth. It may be mentioned, however, that the hook 27 has a central and apertured portion through which the chain bodily may be moved in a free manner, an offset and slotted portion communicating with said central aperture and into which one of the links of the chain may be moved laterally, and a hook portion at the outside of the central portion. The hook member 27 originally is associated with the chain by passing the latter through the central opening and then a ring 28 may be fastened on the free end of the chain so as to maintain the hook member on the chain against removal. In anchoring the automobile in position, the ring 28 and free end of the chain is passed through the loop portion of the strap 25, it being understood that the hook member 27 is associated with that part of the chain then between the strap member and the resilient device 17, and after drawing the chain into a taut condition, the hook member 27 is applied so as to move a link of the chain laterally into the offset, slotted portion of the hook and then the hook portion is engaged with one of the links of the free end portion of the chain. This connection positively holds the runs of the chain together and maintains the device positively connected to the strap 25.

Referring now to Figs. 6 and 7, the front end of the side channel 19 is shown in plan and a cross angle is indicated at 30. These members are additionally connected by a diagonal strap 31. At the front of the member 30, a flat plate 32 is rivetted as indicated at 33 to the member 30 and channel, and between the end of the plate and channel, an opening 34 is provided for the vertical spring of the wheel suspension. This construction is generally standard and is described only to illustrate use and application of the anchoring device to be described.

An anchoring element 35 is shown separately in Fig. 5 and comprises a plate portion 36 having a reversely folded portion 37 which terminates in a short offset flange 38. As shown best by Fig. 6, this folded end and flange have one edge tapered to a smaller width at the bend in the folded portion. The plate portion is angled with respect to the folded portion 37 and has an opening 39 through which the anchoring chain may pass and slats or openings 40 may be provided in adjacent sides of the folded portion to accommodate one of the rivets 33 as will presently be seen.

In applying the element 35, it is first positioned as shown at 41 in Fig. 6, with the flange 38 and folded portion 37 under the triangular opening between the strap 31 and meeting parts of the frame members 19 and 30, and then the element is tilted and raised to move the flange 38 and portion 37 into said triangular opening. Then the element is turned clockwise until the plate portion is directed forwardly as shown at 42, and then the element is moved forwardly until the folded portion embraces the lower leg of the member 30 and edge of the plate 32, it being appreciated that the openings or slots 40 in the folded portion receive the rivet 33 so as to avoid interference. Then the chain may be passed through the opening 39 as shown by Fig. 7 and the grab hook 27 used to connect the runs of the chain.

The shape and structure of the element 35 is such that it cannot be removed from the triangular opening except in a manner the reverse of that in which it is inserted. This prevents disconnections during transportation of vehicles.

It will be appreciated that the arrangements described operatively place the springs 23 of the automobile in the resilient connection as the springs are then between the connection to the frame and the wheels of the automobile and the latter rests on the floor or other support used. It will be evident that then two spring connections are really operating to cushion the automobile, one being the resilient connection 17 and the other being the spring 23 on the frame of the automobile.

While the anchoring device has been shown in connection with an automobile resting on the floor, it is apparent that it may be used in connection with an automobile supported by a frame such as mentioned previously wherein the frame and automobile are in an inclined and oblique position. In this type of construction the anchoring device instead of being secured to the floor or within the housing well 14 is connected to the supporting frame.

While more than one form of the invention has been illustrated and described in detail, it will be apparent to those skilled in the art that various modifications may be made without departing from the scope of the appended claims.

I claim:

1. An article of manufacture for use in a car loading device, comprising a plate having an apertured body portion, a folded portion at one end of the body portion, and a flange projecting from the free end of the folded portion and at an angle to the plane of the folded portion.

2. An article of manufacture for use in a car loading device, comprising a plate having an apertured body portion, a folded portion at one end of the body portion, and a flange projecting from the free end of the folded portion and at an angle to the plane of the folded portion, said folded portion being of less width than the body portion.

3. An article of manufacture for use in a car loading device, comprising a plate having an apertured body portion, a folded portion at one end of the body portion, and a flange projecting from the free end of the folded portion and at an angle to the plane of the folded portion, said folded portion having its reversely bent part narrower than the body portion.

4. An article of manufacture for use in a car loading device, comprising a plate having an apertured body portion, a folded portion at one end of the body portion, and a flange projecting from the free end of the folded portion and at an angle to the plane of the folded portion, said folded portion having its reversely bent part narrower than the body portion and having one edge tapering from the flange and body portion to said reversely bent part.

5. An article of manufacture for use in a car loading device comprising a plate having an apertured body portion, a folded portion at one end of the body portion and directed at an angle to the latter, and a flange projecting from the free end of the folded portion and at an angle to the plane of the folded portion.

6. In combination with a freight car, an automobile in the car having a chassis frame, means on the frame providing a triangular opening, an anchoring plate having a hook-shaped end adapted to engage a part of the frame along one side of said triangular opening, means on the plate for connecting an anchoring device adapted to anchor the automobile in the car and means on the plate for preventing disengagement thereof from the frame unless the plate is bodily turned substantially out of its operating position, whereby the plate is positively maintained in engagement with the frame during transportation of the automobile when the latter is anchored in position in the car.

BEN COLMAN.